Figure 1:
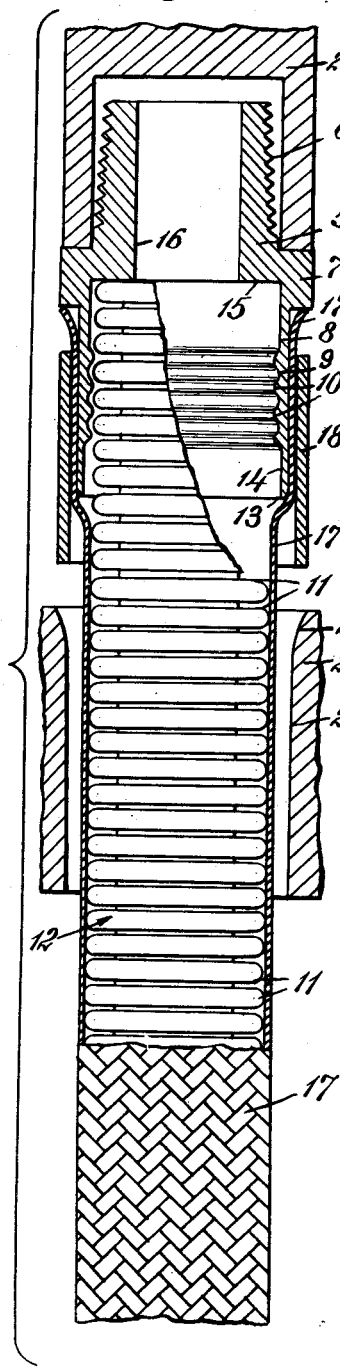

Feb. 2, 1943.                     J. L. VAILL                        2,309,719
                              FLEXIBLE METAL HOSE
                              Filed June 19, 1940

INVENTOR
John L. Vaill
BY
Pennie, Davis, Marvin & Edmonds
ATTORNEYS

Patented Feb. 2, 1943

2,309,719

UNITED STATES PATENT OFFICE 2,309,719

FLEXIBLE METAL HOSE

John Locke Vaill, Middlebury, Conn., assignor to The American Brass Company, a corporation of Connecticut Application June 19, 1940, Serial No. 341,233

3 Claims. (Cl. 285—72)

This invention relates to flexible metal hose and, more particularly, to a flexible metal hose or tube assembly embodying a novel fitting adapted for use with seamless flexible metal tubing of the type having its walls formed with a plurality of closely spaced annular corrugations.

Flexible metal tubes of the type having the walls thereof formed with a plurality of closely spaced annular corrugations are used with particular advantage where a flexible tube is required to carry fluids under high pressures and frequently at elevated temperatures, and to sustain repeated flexures. The provision of such flexible metal tubing with fittings such as male or female threaded members, unions, nozzles, T's, and the like, involves the attachment of such fittings to the metal tubing in such manner as to resist leakage occasioned by the high pressure to which such tubing may be subjected, to resist deterioration of the seal between the fitting and the tube due to elevated temperatures at which fluids may be passed through the tubing, and to withstand failure due to repeated flexing of the tube at and near its juncture with the fitting.

Attachment of fittings to flexible metal tube or hose by brazing or welding is expensive, and this disadvantage also applies to fittings which are attached to flexible metal tubes by heretofore known mechanical means. In the latter case, a further disadvantage lies in the number of parts required and the concomitant increased expense of making the many parts and applying them to the tube.

Fittings of the type which are brazed, or welded to a flexible metal tube require the application of brazing or welding metal at a high temperature to the end of the fitting adjacent the flexible tube. The heat applied in making the brazed or welded joint serves unavoidably to anneal the metal of the tube where it approaches and enters the fitting. This has been found to be objectionable when the metal tube is subjected to repeated flexing, because the flexing takes place not only throughout the length of the tube but also at and near the point of entry of the tube into the fitting. Flexing of the tube where it has been annealed by the heat of brazing or welding often leads to premature failure of the tube in this region. Moreover, the annealed section of the tube is mechanically weaker than the balance of the tube and cannot with safety be subjected to pressures which the tube, were it not annealed, could otherwise safely withstand.

Attachment of fittings to flexible metal hose by soldering requires the use of corrosive solder fluxes, and unless care is taken to insure complete removal of the flux from the tube after the soldering operation is complete, residual flux will corrode the metal of the tube and lead to its premature failure. The step of completely removing the flux from the tube involves an extra operation which requires considerable care and attendant expense.

The present invention provides an improved fitting such as a threaded fitting, union, nozzle, T, or the like, which can be attached to flexible metal hose or tubing more inexpensively than by the known methods of soldering, brazing, or welding, and with a sealed connection which is heat-proof and which avoids any annealing of the flexible metal tubing in the neighborhood of the seal. Moreover, the new fitting is simpler and easier to manufacture and apply to flexible metal tubes than heretofore known mechanically attached fittings. The fitting of my invention comprises a fitting portion of desired configuration and a sleeve portion, the sleeve portion having substantially cylindrical interior and exterior surfaces. The sleeve portion may be so proportioned that its internal diameter is greater than the external diameter of the flexible metal hose or tubing to which it is to be attached, or it may be so proportioned that its external diameter is less than the internal diameter of the flexible metal tubing to which it is to be attached. The cylindrical surface of the sleeve portion which is to come in contact with the flexible metal tubing is provided with a plurality of annular ribs defining one or more grooves having a pitch and contour conforming substantially to the pitch and contour of the annular corrugations of the flexible metal tubing. The annular ribs and grooves preferably are formed on the cylindrical surface of the sleeve portion a substantial distance inwardly from the outer extremity of the sleeve portion of the fitting, as by forming the annular ribs substantially intermediate the ends of the cylindrical surface of the sleeve portion, whereby a substantially smooth cylindrical surface is provided from the ribs to the outer extremity of the cylindrical surface of the sleeve portion. The surface of the sleeve portion provided with the annular ribs terminates with advantage in a projecting shoulder adjacent the central portion of the fitting, against which the end of the tube abuts, whereby the tube may be held in substantially fixed position while the fitting is being attached, and providing for a substantially smooth interior wall at the point of fitting and tube juncture.

The fitting is assembled with a flexible metal hose or tube by mounting the sleeve portion of the fitting on the flexible metal tube and pressing such sleeve portion tightly against the tube with the annular ribs of the fitting engaging between the annular corrugations of the tube and with such corrugations seated tightly in the grooves between the ribs. If the fitting is of the type having a sleeve portion of interior diameter slightly greater than the outer diameter of the tube, the sleeve portion of the fitting is mounted over the tube and is compressed tightly thereagainst. On the other hand, if the fitting is of the type having a sleeve portion of outer diameter slightly less than the inner diameter of the flexible metal tube, the sleeve portion of the fitting is inserted into the interior of the tube and expanded tightly thereagainst. In each case, of course, the compression or expansion is such as to cause the annular corrugations of the metal tube to be seated tightly between the annular ribs of the sleeve portion.

With the annular ribs of the sleeve portion of the fitting being spaced inwardly a substantial distance from the outer extremity of the sleeve portion of the fitting, a substantially smooth cylindrical surface is provided between the ribs and the outer extremity of the sleeve portion, whereby the seal between the flexible tube and the fitting at the points where the corrugation of the tube seat in the grooves of the fitting is isolated from flexing portions of the tube.

Flexible metal hoses or tubes commonly are provided with one or more surrounding braids of metallic wires to prevent extension of the tube when the latter is used to transmit fluids at high pressures. The invention provides simple and effective means for attaching such braid securely to the fitting, particularly when the fitting employed is of the type having a sleeve portion of slightly larger internal diameter than the outer diameter of the flexible metal tube. With such a fitting mounted over the flexible tube and compressed tightly thereagainst, the braid is drawn up to extend over the sleeve portion of the fitting, and an annular ring is compressed tightly about the braid surrounding the sleeve portion of the fitting in such manner as to lock the braid tightly to the fitting. If a fitting is employed having a sleeve portion of slightly smaller exterior diameter than the internal diameter of the tube, the braid may be locked directly to the outer surface of the tube in the vicinity of the fitting by means of a ring compressed about the braid and holding it tightly to the tube. The fitting may be applied to the flexible metal tube before application of the braid and attachment thereof to the fitting, or the fitting, tube, braid, and annular ring may all be assembled in proper positions, and the resulting assembly may be subjected to pressure in such manner that all parts are locked together in a single operation.

Figure 2:
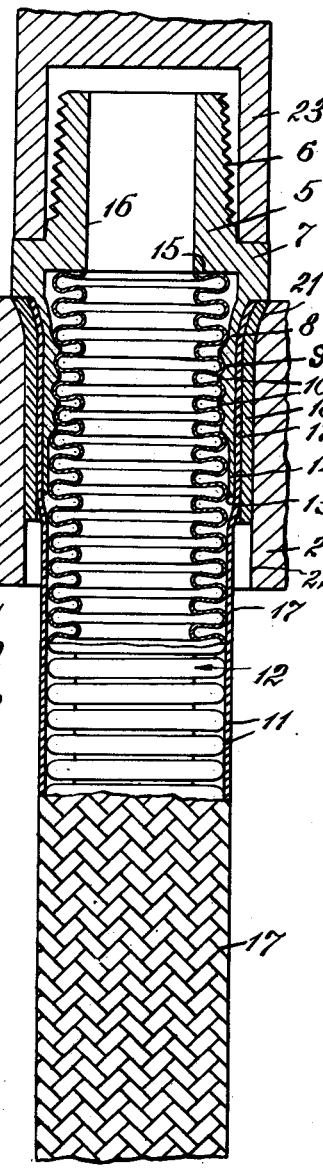
Figure 3:
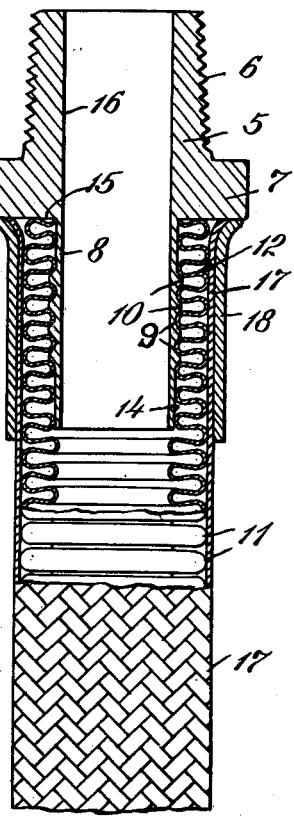

Further details of a specific embodiment of a fitting of this invention and its method of attachment to a flexible metal tube are described below with reference to the accompanying drawing, wherein Fig. 1 is a longitudinal view, partly in section, showing the fitting of the invention disposed at the end of a flexible metal tube in position to be attached thereto;

Fig. 2 is a broken plan view partly in section showing the fitting being attached to the flexible metal tubing; and Fig. 3 is a longitudinal view, partly in section, of a modified form of fitting of this invention attached to a flexible metal tube.

The fitting shown in Figs. 1 and 2 comprises an end fitting having a suitably configured fitting portion 5 which, in this illustration, comprises a coupling provided with standard threads 6 on its exterior surface. The central exterior portion of the fitting is provided with an outwardly projecting shoulder 7, preferably in hexagonal form, to permit holding the fitting with a wrench while connecting it to a complementary coupling.

The other end of the fitting comprises a sleeve portion 8 having substantially cylindrical exterior and interior surfaces, the internal diameter of the sleeve portion being greater than the external diameter of the tube to which it is to be attached. The interior surface of the sleeve portion 8 is provided with annular grooves 9 defined by a plurality of annular ribs 10 projecting inwardly from this interior surface and having a pitch and contour conforming substantially to the pitch and contour of the annular corrugations 11 of a flexible metal hose or tube 12 of the type having its walls formed with a plurality of closely spaced annular corrugations 11. The annular ribs 10 are positioned substantially intermediate the ends of the interior cylindrical surface of the sleeve portion 8 and are thus disposed on this interior cylindrical surface of the sleeve portion 8 a substantial distance inwardly from the outer extremity 13 of the sleeve portion. This construction provides a substantially smooth cylindrical surface 14 on the interior surface of the sleeve portion 8 between the ribs 10 and the outer extremity 13 of the sleeve portion.

The interior surface of the sleeve portion 8 terminates in an inwardly projecting shoulder 15 against which the end of the flexible metal tube or hose 12 abuts. The shoulder 15 is provided in the fitting shown in Figs. 1 and 2 by making the bore 16 of the fitting portion 5 substantially smaller in diameter than the internal diameter of the sleeve portion 8, thus providing for a substantially smooth inner wall at the junction of the fitting with the end of the flexible metal tube, although any form of inwardly projecting shoulder may of course be provided in lieu of this construction if the bore 16 of the fitting portion 5 is approximately as large as or greater than the internal diameter of the sleeve portion 8.

The fitting is placed in position for attachment to the flexible metal tube 12 by inserting the end of the tube within the sleeve portion 8 of the end fitting so that the end of the tube abuts against the shoulder 15 of the fitting. If the flexible metal tube is provided with one or more layers of metal braid 17 so as to withstand a greater internal fluid pressure in service, as shown in Figs. 1 and 2, the metal braid is brought up over the exterior cylindrical surface of the sleeve portion 8. An annular lock ring 18, advantageously of relatively soft metal such as copper or brass, is provided for holding the braid in position adjacent the exterior surface of the sleeve portion 8 and is slid along the outside of the braid 17 after the braid is brought into position around the exterior surface of the sleeve portion 8. The lock ring 18 is forced by hand as close as possible to the outwardly projecting shoulder 7 adjacent the central portion of the fitting 5. The fitting is then in position to be swaged onto the flexible metal tube.

The swaging operation may be effected by forcing the end fitting assembly into a slightly tapered die 20 having an outwardly flaring opening 21. The internal diameter along the main interior surface 22 of the die is substantially smaller than the external diameter of the sleeve portion 8 if the flexible metal tube is not provided with a metal braid, in which event the lock ring 18 may be eliminated, or with an internal diameter substantially smaller than the outside diameter of the lock ring 18 if the flexible metal tubing is provided with metal braid and a lock ring is employed, as shown in Figs. 1 and 2.

The end fitting and flexible metal tube assembly is forced into the tapered die 20 by a plunger 23 which imparts its thrust to the end fitting 5. As the assembly of end fitting and flexible metal tube is forced into the tapered die the lock ring 18 is compressed about the metal braid 17 and the sleeve portion 8 is simultaneously compressed about the tube 12, thereby forcing the annular ribs 10 into position between the annular corrugations 11 and causing the latter to be seated tightly in the annular grooves 9, as shown in Fig. 2. The resulting pressure-tight seal between the fitting and the flexible metal tube may be obtained with only slight distortion of these annular corrugations and without noticeably diminishing the internal diameter of the tube. The metal braid is locked in position between the exterior cylindrical surface of the sleeve portion 8 and the lock ring 18, thus holding the braid in position to resist elongation of the flexible metal tube when the tube is subjected to high internal fluid pressure in service.

The modified form of fitting shown in Fig. 3 differs from the fitting shown in Figs. 1 and 2 in that the cylindrical sleeve portion 8 has an external diameter smaller than the internal diameter of the flexible metal tube 12 to permit insertion of the sleeve 8 inside the end of the tube. The exterior cylindrical surface of the sleeve portion 8 is provided with the annular grooves 9 and ribs 10 similar in form and position to those of the annular ribs shown in Figs. 1 and 2. Attachment of this modified form of fitting to a flexible metal tube is made by inserting the sleeve portion 8 into the interior of the flexible metal tube 12, and if the tube is provided with one or more layers of metal braid 17, as shown in the drawing, a lock ring 18 is provided around the braid in the same manner as shown in Figs. 1 and 2. Upon forcing this assembly of end fitting and flexible metal tube into a tapered die, which preferably in this case is employed in conjunction with a mandrel for expanding the sleeve portion 8 of the fitting against the inner wall of the tube, the lock ring 18 is compressed, thus locking the braid in position about the exterior annular corrugations 11 of the tube and at the same time expanding the sleeve portion of the fitting to force the annular ribs 10 outwardly into position between the corrugations of the tube and to cause the latter to be seated tightly in the grooves 9, thereby forming a pressure-tight seal between the sleeve portion 8 and the tube.

The substantially smooth cylindrical surface 14 of the sleeve portion 8 between the annular ribs 10 and the extremity 13 of the sleeve portion 8 prevents any flexing of the tube in the interior of the fitting in the immediate vicinity of the seal provided between the annular grooves 9 and the annular corrugations 11 of the tube. This feature is important inasmuch as isolation of the seal from the flexing portions of the metal tube insures a permanent seal which is not loosened or broken when the tube is flexed in service.

The fitting of my invention is simple to manufacture and is readily attached to flexible metal tubing or hose. The cost of the fitting parts and the cost of attaching the fitting to a flexible metal tube is only a fraction of the cost of heretofore known heat-proof fittings. The fitting of my invention is attached to a flexible metal tube without the application of heat, thereby eliminating any possibility of annealing, and consequently weakening, the flexible metal tube. Furthermore, the fitting is applied without the use of corrosive fluxes such as are used in soldering, so that damage to the metal of the tube from this source is eliminated. All parts of the fitting may be of metal, with the resulting advantages that attend the use of such material throughout. The seal between the fitting and the tube is not affected by heat, and resists fluid pressures within the tube substantially as high as those which the tube itself is capable of withstanding. The new fitting may therefore be employed in assembly with a flexible metal tube in virtually any manner in which such fittings and tube assemblies have heretofore been employed, and is more economical and in many cases more durable than heretofore available fittings and tube assemblies.

I claim:

1. A flexible metal tube assembly which comprises a flexible metal tube of the type having its walls formed with a plurality of closely spaced annular corrugations, a fitting comprising a fitting portion of desired configuration and a substantially cylindrical sleeve portion formed integrally with said fitting portion and provided with a plurality of annular ribs formed on the interior surface thereof defining one or more annular grooves conforming substantially to the pitch and contour of the annular corrugations of the flexible metal tube, said sleeve portion being mounted over the flexible metal tube and being compressed tightly thereagainst with the annular ribs engaging between the annular corrugations of the flexible metal tube and with the latter seated tightly in the grooves, a metallic braid surrounding the tube and extending over the outer surface of the sleeve portion of the fitting, and an annular ring compressed tightly about the metal braid surrounding the sleeve portion of the fitting in such manner as to lock the braid tightly to the fitting.

2. A flexible metal tube assembly which comprises a flexible metal tube of the type having its walls formed with a plurality of closely spaced annular corrugations, and a fitting comprising a coupling portion of desired configuration and a sleeve portion formed integral with said coupling portion and having substantially cylindrical exterior and interior surfaces, the interior cylindrical surface of the sleeve portion terminating in an inwardly projecting shoulder and being provided with a plurality of annular ribs spaced inwardly a substantial distance from the outer extremity thereof, the inner diameters of said annular ribs being less than the inner diameter of the adjacent portion of the sleeve outwardly from the annular ribs, said annular ribs defining at least one annular groove conforming substantially to the pitch and contour of the annular corrugations of the flexible metal tube, said sleeve portion being mounted over the flexible metal tube with the end of the tube abutting against the inwardly projecting shoulder and with the annular ribs engaging between the annular corrugations of the flexible metal tube and with the latter seated tightly in the groove, the interior surface of the sleeve between its outer extremity and the annular ribs being substantially smooth and lying in contact with the corrugations closely adjacent the corrugations in contact with the annular ribs, so that flexing of the flexible metal tube is prevented closely adjacent the corrugations in contact with the annular ribs.

3. A flexible metal tube assembly which comprises a flexible metal tube of the type having its walls formed with a plurality of closely spaced annular corrugations, and a fitting comprising a coupling portion of desired configuration and a sleeve portion formed integral with said coupling portion and having substantially cylindrical exterior and interior surfaces, the interior cylindrical surface of the sleeve portion terminating in an inwardly projecting shoulder and being provided with a plurality of annular ribs intermediate the ends of the interior surface of the sleeve portion, the inner diameter of said annular ribs being less than the inner diameter of the adjacent portions of the sleeve, the annular ribs defining at least one annular groove conforming substantially to the pitch and contour of the annular corrugations of the flexible metal tube, said sleeve portion being mounted over the flexible metal tube with the end of the tube abutting against the inwardly projecting shoulder and with the annular ribs engaging between the annular corrugations of the flexible metal tube and with the latter seated tightly in the groove, the interior surface of the sleeve between its outer extremity and the annular ribs being substantially smooth and lying in contact with the corrugations closely adjacent the corrugations in contact with the annular ribs, so that flexing of the flexible metal tube is prevented closely adjacent the corrugations in contact with the annular ribs.

JOHN LOCKE VAILL.